(12) United States Patent
Husemann et al.

(10) Patent No.: US 7,084,185 B2
(45) Date of Patent: Aug. 1, 2006

(54) METHOD FOR THE PRODUCTION OF CROSS-LINKABLE ACRYLATE CONTACT ADHESIVE MATERIALS

(75) Inventors: Marc Husemann, Hamburg (DE); Stephan Zöllner, Hamburg (DE); Nico Diamantis, Lehe (DE)

(73) Assignee: tesa AG, Hamburg (DE)

( * ) Notice: Subject to any disclaimer, the term of this patent is extended or adjusted under 35 U.S.C. 154(b) by 298 days.

(21) Appl. No.: 10/297,149

(22) PCT Filed: Jun. 15, 2001

(86) PCT No.: PCT/EP01/06770

§ 371 (c)(1),
(2), (4) Date: Nov. 29, 2002

(87) PCT Pub. No.: WO01/96413

PCT Pub. Date: Dec. 20, 2001

(65) Prior Publication Data

US 2003/0171448 A1 Sep. 11, 2003

(30) Foreign Application Priority Data

Jun. 15, 2000 (DE) .......................... 100 29 554

(51) Int. Cl.
*C08F 2/46* (2006.01)

(52) U.S. Cl. ................. 522/149; 522/84; 522/113; 522/114; 522/119; 522/120; 522/121; 522/134; 522/135; 522/137; 522/141; 522/142; 522/144; 522/146; 522/150; 522/153; 522/178; 522/182; 428/355 R; 428/355 AC; 525/383; 525/384; 525/386

(58) Field of Classification Search ................. 522/178, 522/182, 113, 114, 119, 120, 121, 150, 153, 522/134, 135, 136, 141, 144, 146, 149, 84; 428/355 R, 355 AC; 525/383, 384, 386
See application file for complete search history.

(56) References Cited

U.S. PATENT DOCUMENTS

| | | | |
|---|---|---|---|
| 4,234,662 A | 11/1980 | Pastor et al. |
| 4,235,981 A | 11/1980 | Tsuchiya |
| 4,665,106 A | 5/1987 | Ohta et al. |
| 5,223,582 A | 6/1993 | Blum et al. |
| 5,276,069 A | 1/1994 | Rehmer et al. |
| 5,393,798 A | 2/1995 | Weber |
| 5,536,759 A | 7/1996 | Ramharack et al. |

FOREIGN PATENT DOCUMENTS

| | | |
|---|---|---|
| DE | 26 35 123 A1 | 2/1977 |
| DE | 27 46 683 A1 | 4/1979 |
| DE | 43 13 008 C1 | 11/1994 |
| EP | 0 168 126 A1 | 1/1986 |
| EP | 0 350 664 A2 | 1/1990 |
| EP | 0 458 164 A2 | 11/1991 |
| EP | 0 481 295 A2 | 4/1992 |
| EP | 0 608 981 B1 | 4/2002 |
| FR | 2 691 971 A1 | 6/1993 |
| GB | 2 219 591 A | 12/1989 |
| WO | WO 95/00560 | 1/1995 |
| WO | WO 97/46594 | 12/1997 |

*Primary Examiner*—James J. Seidleck
*Assistant Examiner*—Sanza L. McClendon
(74) *Attorney, Agent, or Firm*—Norris McLaughlin & Marcus PA

(57) ABSTRACT

Process for preparing crosslinked pressure ensitive adhesives, in which a plyacrylate is prepared by the free radical copolymericzation of a monomer mixture , the polyacrylate is then concentrated and the concentrated polyacrylate is reacted with further monomers having functional groups and subsequently crosslinking.

20 Claims, No Drawings

METHOD FOR THE PRODUCTION OF CROSS-LINKABLE ACRYLATE CONTACT ADHESIVE MATERIALS

This is a 371 of PCT/EP01/06770 filed 15 Jun. 2001 (international filing date).

The invention relates to a process for preparing polyacrylates which are functionalized with double bonds and have pressure-sensitively adhesive properties, whose cohesion is increased by radiation-induced crosslinking, and to an adhesive tape provided with this polyacrylate pressure sensitive adhesive.

BACKGROUND OF THE INVENTION

Hotmelt pressure sensitive adhesives (hot melt PSAs) are compounds which combine the properties of hotmelt adhesives with those of pressure sensitive adhesives. Hotmelt PSAs melt at elevated temperatures and cool to form a permanently tacky film which flows adhesively on contact with a substrate. In combination with various substrates, such as paper, fabric, metal, and polymer films, for example, it is possible to produce a large number of different products, particularly pressure sensitive adhesive tapes and also labels. These pressure sensitive adhesive products have a broad field of application in the automobile industry, e.g., for fastening or for sealing, or in the pharmaceutical industry, for active substance patches, for example.

The typical coating temperature for hotmelt PSAs lies between 80 and 180° C. In order to minimize the coating temperature, the molecular weight of the hotmelt PSA to be applied should be as low as possible. On the other hand, the PSA must also possess a certain level of cohesion, so that the PSA tape does not slip from the substrate in use. In order to increase the cohesion, in turn, a high molecular weight is essential.

In order to solve this problem polymers have been developed which possess a relatively low molecular weight but contain double bonds along the side chains. These polymers, such as polyester acrylates or polyurethane acrylates, for example, can be crosslinked efficiently via the double bonds using UV or ionizing radiation, but have only limited adhesive properties.

In acrylic PSAs, crosslinking is promoted by adding polyfunctional acrylates and/or methacrylates prior to crosslinking, which raise the crosslinking reactivity and hence also increase the cohesion, but which react only by way of a two-stage mechanism during irradiation (attachment to the polymer and then crosslinking reaction by way of the acrylate double bond which is still free) and therefore have a low crosslinking efficiency.

The principle of functionalizing double bonds by copolymerization cannot be employed analogously for acrylic PSAs, since in that case the corresponding polyacrylates are prepared by free radical polymerization. All of the double bonds here are reacted in the polymerization process, or instances of gelling occur during polymerization. One example of this was depicted by Pastor [U.S. Pat. No. 4,234,662 A], who used allyl acrylate or allyl methacrylate for the polymerization. A central problem, however, lies in the copolymerization of these compounds, which generally gel during the free radical polymerization process. Moreover, owing to the relatively low reactivity of the allyl groups in respect of a crosslinking reaction, drastic experimental conditions are necessary, in particular high temperatures or a long period of irradiation. For application as a crosslinked PSA, therefore, the allyl-modified acrylic polymers are not very suitable.

Another possibility for functionalization of double bonds exists by virtue of polymer-analogous reactions.

Generally speaking, polymer-analogous reactions can be conducted in solution or from the melt. EP 0 608 981 B1 likewise refers to the gelling problem with double bonds. This is assisted by diverse further polymer-analogous reactions. Accordingly, polyacrylates with carboxylic acid, hydroxyl, epoxide, and amine groups can be reacted in a polymer-analogous reaction with compounds containing double bonds; in this regard see U.S. Pat. No. 4,665,106 A. Owing to the low thermal stability of the components involved, however, it has not been possible to apply this reaction to hotmelts. Moreover, operating conditions were disadvantageous owing to the fact that in order to avoid gelling it was necessary to add large amounts of regulator to the polyacrylate.

For acrylic hotmelts, therefore, U.S. Pat. No. 5,536,759 A describes the reaction of polyacrylates containing hydroxyl or carboxylic acid groups with 1-(1-isocyanato-1-methylethyl)-3-(1-methylethenyl)benzene (m-TMI) in solution with subsequent hotmelt processing. It is in contrast to this that the pros and cons of the individual processes are described (Chemie Ingenieur Technik (70), 1998, pp. 560–566); "Polymer-analogous reactions in the melt permit two processes which otherwise proceed separately from one another. First of all, the reaction takes place; since the reaction medium is the melt, shaping by extrusion can be commenced during the reaction. In this way, no additional reaction vessel and no work-up at all are necessary. Nevertheless, the absence of the solvent complicates the course of the reaction in a variety of respects; for example, by the heterogeneity of the reaction mixture and the relatively slow diffusion of the reactants into one another".

Accordingly, the process described in EP 0 608 981 B1 displays the fundamental disadvantages of a polymer-analogous reaction in solution. What would be desirable, therefore, would be a process for acrylic PSAs which allows polymer-analogous reactions in the melt.

A central problem lies in the slow diffusion of the reactants. This problem can be solved only by raising the reaction temperatures, which improves the reactivity of the individual components with one another. For acrylic PSAs, however, there are natural limits on this.

For polymer-analogous reactions in the melt, therefore, the materials used are generally thermoplastics, which are processed and functionalized at high temperatures. For example, polystyrene-maleic anhydride thermo-plastics are reacted at temperatures of 180–200° C. [Chemie Ingenieur Technik (70), 1998, pp. 560–566 and Chemie Ingenieur Technik (71), 1999, pp. 1418–1421]. Additionally, polyesters are reacted with maleic anhydride in the melt [Journal of Polymer Science: Part A: Polymer Chemistry, Vol. 37, 1693–1702 (1999)]. Both processes, however, are unsuitable for the functionalization for acrylic PSAs with double bonds. Journal of Polymer Science: Part A: Polymer Chemistry, Vol. 37, 1603–1702 (1999) discloses functionalization by radical grafting, but this cannot be used for functionalization with double bonds on account of the fact that the vinyl compounds would immediately be polymerized and so would no longer be available for subsequent crosslinking on the backing. The prior art uses polymers [Chemie Ingenieur Technik (70), 1998, pp 560–566] whose glass transition temperatures are too high for PSAs and, if applied analogously to acrylic PSAs, would exhibit excessively high reaction temperatures (at the high temperatures employed, severe discoloration of the polymer already occurs, owing to reactions by, for example, thermally decomposing initiators which have remained after the polymerization process or by the decomposition of individual copolymers, such as tert-butyl acrylate, for example, at above 160° C., and also possess very high fractions of copolymerized maleic anhydride, which places the glass transition temperature very high. The process described in U.S. Pat. No. 5,536,759 A for reacting polyacrylates with 1-(1-isocyanato-1-methylethyl)-3-(1-methylethenyl) benzene (m-TMI) in solution can also not be applied analogously for the processes described above, since in addition to the high toxicity of the isocyanates the crosslinking reactivity after coating would be too low.

A serious and general disadvantage of all of the processes described so far lies in the low crosslinking reactivity after coating. Vinyl compounds have a low reactivity toward the radicals that are generated for crosslinking, with the consequence that crosslinking is incomplete and not very effective. Competing reactions which do not lead to the desired crosslinking, such as saturation of the radicals produced by atmospheric oxygen or added tackifier resins, predominate. The poor controllability of crosslinking may therefore be very problematic, for example, for the aging behavior of the PSA, since unless all of the double bonds are consumed by reaction during crosslinking, the PSA will have a potential for post-crosslinking on prolonged storage and also, under the influence of ultraviolet light or oxygen and/or ozone, will react and undergo a marked loss of bond strength.

There is therefore a need for compounds which can be reacted very quickly and without gelling in a polymer-analogous reaction and for a process operation which allows gel-free processing and coating on a backing, with the aim of obtaining new kinds of acrylic PSA tapes functionalized by reactive double bonds, which can be crosslinked with high reactivity by actinic radiation.

SUMMARY OF THE INVENTION

It is an object of the invention to provide a process for preparing pressure sensitive adhesives on an acrylic basis which have a viscoelastic behavior at room temperature and which do not show the disadvantages of the prior art. The aims are to prevent gelling of the PSAs during the hot melt process; in particular, not to lose the thermal stability of the PSA as a result of incorporation of the double bonds; that it should be possible to subsequently coat the acrylic PSA provided with reactive double bonds from the melt onto a backing without gel; and that said PSA should be crosslinked with high crosslinking efficiency.

This object is achieved, surprisingly and unforeseeably for the skilled worker, by a process as set out in the main claim. The further claims relate to advantageous developments of this process, to the pressure sensitive adhesive prepared thereby, and to a use for said adhesive.

The invention accordingly provides a process for preparing crosslinked acrylic pressure sensitive adhesives which involves first preparing polyacrylates by free-radical (co) polymerization from the following monomers:

(a) acrylic and methacrylic acid monomers of the following structure:

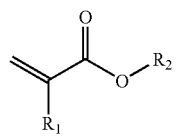

where $R_1$H or $CH_3$
and $R_2$= an alkyl chain with 2–20 carbon atoms
with a fraction of 45–99.5% by weight in the monomer mixture, (b) one or more carboxylic anhydrides containing olefinic double bonds, with a fraction of 0.5–25% by weight in the monomer mixture, more preferably with a fraction of 1–5% by weight in the monomer mixture, (c) further olefinically unsaturated monomers possessing functional groups A, with a fraction of 0–30% by weight in the monomer mixture, concentrating the polymers thus prepared to give a polyacrylate composition whose solvent content is $\leq 2\%$ by weight, adding further monomers to the polyacrylate composition, these monomers possessing at least two functional groups B and C, the groups B being able to enter into polymer-analogous reactions with the carboxylic anhydrides, and the groups C being crosslinkable groups, a reaction taking place between the functional groups B and the carboxylic anhydride, which attaches the monomers containing functional groups B as side chains to the polymers, following the reaction between the functional groups B and the carboxylic anhydride, applying the pressure sensitive adhesive from the melt to a backing, and carrying out crosslinking of the polymers on the backing by means of high-energy radiation.

The process makes it possible to introduce into the polymers functional groups which are available for efficient crosslinking later on under mild conditions, without the functional groups which permit crosslinking being consumed or losing their functionality during the polymerization process.

As a result of the introduction of the compounds containing the functional groups B and C after polymerization has already taken place, the functional groups C which are reactive for crosslinking retain their reactivity even following incorporation into the polymer chains. Functional groups which possess a high efficiency for the crosslinking reaction can be introduced into the polymers in this way, even though in the case of a free-radical polymerization these functional groups would lose their functionality.

The average molecular weights (weight average $M_w$) of the PSAs which form in the course of the free-radical polymerization are chosen such that they are situated within a range which is customary for polyacrylate compositions, i.e., between 100000 and 2000000; specifically for further use as hotmelt PSAs, PSAs having molecular weights (weight average $M_w$) of from 100000 to 800000, more preferably from 100000 to 400000, g/mol are prepared. The polymerization may be conducted in the presence of an organic solvent, in the presence of water or in mixtures of organic solvents and water. The aim is to minimize the amount of solvent used. Depending on conversion and temperature, the polymerization time is between 6 and 48 hours. The higher the reaction temperature which can be chosen, i.e., the higher the thermal stability of the reaction mixture, the shorter the reaction time that can be chosen.

For the purposes of the invention it is particularly advantageous to operate the process such that the addition of the monomers possessing the functional groups B and C and the reaction of the functional groups B with the carboxylic anhydride take place directly after the concentration step.

In one development of the invention, this operation takes place in an extruder: a twin-screw extruder (e.g. Werner & Pfleiderer, ZSK 40) or a co-kneader (e.g. Buss) have been found highly suitable for this purpose (reactive extrusion). In the extruder, the acrylic PSAs prepared by free-radical polymerization are concentrated and freed from the solvent. Advantageously for the process of the invention, the solvent content of the polymer composition following the concentration operation is less than 0.5% by weight. Following concentration the component provided with the functional groups B and C is added to the extruder or to the co-kneader, preferably by metering. Here, the reaction takes place between the functional groups B and the carboxylic anhydride groups incorporated into the polymer chains. In one preferred embodiment of the inventive process, the addition may be made in a second extruder. In this case the optimum reaction conditions can be set by means of barrel length, throughput (rotary speed), kneading temperature, and amount of any catalyst added. Moreover, a relatively low-shear screw geometry of the extruder should be chosen in order to prevent instances of gelling during operation.

Advantageously for the purposes of the invention it is possible to use any compounds which contain crosslinkable groups C and which also possess a hydroxyl function that can react with the carboxylic anhydride.

As well as compounds substituted by hydroxyl groups, it is possible to make favorable use, for the inventive process, of compounds containing crosslinkable groups C and also containing other functional groups which are able to react, directly or under catalysis, with the carboxylic anhydride, particularly in a linking reaction. Such functional groups are familiar to the skilled worker; here, mention may be made, by way of example and without wishing to be unnecessarily restricted by their listing, of the following: alkoxy groups, mercapto groups, thioether groups, hydroxyl groups, unsubstituted and substituted amino groups, oxazolines and/or unsubstituted or substituted amido groups, as well as all other functional groups which are reactive with carboxylic anhydrides in the sense outlined above.

In order to ensure good and efficient crosslinking of the polymers, examples of crosslinkable groups B used to outstanding effect are vinyl groups or, even more preferably, acrylate or methacrylate groups, which may also be in the form of their substituted derivatives. Accordingly, monomers containing functional groups B and C which are advantageous in the sense of the inventive concept are hydroxyl-containing acrylates, such as, very preferably, for example, 2-hydroxyethyl acrylate (2-HEA, acrylic acid 2-hydroxyethyl ester), hydroxypropyl acrylate (acrylic acid 3-hydroxypropyl ester), and hydroxyl-containing methacrylates, such as 2-hydroxyethyl methacrylate (2-HEMA, methacrylic acid 2-hydroxyethyl ester), hydroxypropyl methacrylate (methacrylic acid 3-hydroxypropyl ester), for example, and/or vinyl compounds, such as 1-decenol, for example, oxazolines, such as ricinenealkyloxazoline or soyaalkyloxazoline, for example, acrylamides, such as butoxymethylacrylamide, for example, or substituted amino compounds, such as tert-butylaminoethyl methacrylate, for example.

The molar fraction of the compound added which is functionalized by the groups B and C corresponds preferably to the molar amount of the carboxylic anhydride which is incorporated by polymerization in the polyacrylate chain, but may also be chosen to be smaller or larger than that amount.

The amount of the compound functionalized by the groups B and C which is added is very preferably chosen such that the molar ratio of the number $n_B$ of functional groups B of the added monomers to the number $n_{CSA}$ of the copolymerized carboxylic anhydride units $n_B/n_{CSA}$, is within a range of magnitude of between 0.8 and 1.2, very preferably between 0.8 and 1, i.e., $n_B/n_{CSA}$ is $\leq 1$.

In one preferred variant of the inventive process between 0.1 and 25%, preferably between 1 and 19%, by weight of the compounds functionalized by groups B and C—based on the polymer—are added. Through the amount of the copolymerized carboxylic anhydride and through the amount of the compound functionalized with B or C it is possible to control the reaction rate for the polymer-analogous reaction in the melt.

In one procedure which is very favorable for the process, catalysts are added in order to raise the reactivity. The fraction of the catalyst is between 0.01 and 5 mol %, but preferably between 0.1 and 0.5 mol %, based on the carboxylic anhydride.

The reaction proceeds under catalysis by acid or bases. As acids it is possible to use all Lewis acid compounds. The reaction proceeds preferably with p-toluenesulfonic acid, itaconic acid, dibutyltin oxide or with sodium acetate. As bases it is possible to use all Lewis bases. The reaction proceeds preferably under 4-vinylaniline catalysis.

In accordance with the flow viscosity of the polyacrylate used, the reaction proceeds at elevated temperatures. The temperatures chosen are preferably between 60 and 180° C.: in one particularly preferred range, between 110 and 160° C.

For the process of the invention it may likewise be of advantage to vary the molecular weight and to improve the processing properties in the melt. Thus it is possible, for example, by reducing the molecular weight to lower the flow viscosity and so to increase the reaction propensity. A further point is the processing properties under shear in the extruder, since PSAs of relatively low viscosity and relatively low molecular mass are easier to process in the extruder and the shear introduced is therefore greatly reduced.

Compounding—that is, the addition of further additives—may generally be carried out likewise in the same apparatus as the previous steps, in a further extruder or in a compounder, where additional commixing of the polymer composition may also take place.

To produce the adhesive tapes, the polymers described above are optionally blended with crosslinkers: suitable crosslinker substances in this sense are difunctional or polyfunctional acrylates, difunctional or polyfunctional isocyanates or difunctional or polyfunctional epoxides. It is, however, also possible here to use any further difunctional or polyfunctional compounds which are familiar to the skilled worker and are capable of crosslinking polyacrylates.

For crosslinking with ultraviolet radiation, photoinitiators are used. Examples of photoinitiators that may be mentioned, without wishing to impose unnecessary restriction, include cleaving (radical-forming) photoinitiators, especially α-cleavers, and hydrogen abstractors. For the group of the photo cleaving initiators, examples that may be mentioned include aromatic carbonyl compounds, especially benzoin derivatives, benzil ketals, and acetophenone derivatives. The hydrogen abstractors include, for example, aromatic ketones, such as benzophenone, benzil, and thioxanthones, for example.

Moreover, in order to prepare pressure sensitive adhesives, these elastomers are optionally blended with at least one resin. Tackifying resins to be added include without exception all existing tackifier resins described in the literature. Representatives that may be mentioned include pinene resins, indene resins, and rosins, their disproportionated, hydrogenated, polymerized, esterified derivatives and salts, the aliphatic and aromatic hydrocarbon resins, terpene resins and terpene-phenolic resins, and also C5, C9 and other hydrocarbon resins. Any desired combinations of these and further resins may be used in order to adjust the properties of the resulting adhesive in accordance with what is desired. In general it is possible to use all resins which are compatible (soluble) with the corresponding polyacrylate. Explicit reference is made to the depiction of the state of the art in the "Handbook of Pressure Sensitive Adhesive Technology" by Donatas Satas (van Nostrand, 1989).

The acrylic hotmelts may further be blended with one or more additives such as aging inhibitors, light stabilizers, ozone protectants, fatty acids, resins, plasticizers, nucleators, blowing agents, and accelerators. As aging inhibitors it is possible to use both primary and secondary aging inhibitors and also light stabilizers, including their combination with one another. Reference is made only at this point to the appropriate Irganox™ grades from Ciba Geigy and Hostanox™ from Clariant. As further outstanding agents against aging it is possible to use phenothiazine (carbon radical scavenger) and also hydroquinone methyl ether in the presence of oxygen, and also oxygen itself.

Furthermore, the hotmelt PSAs may be filled with one or more fillers such as fibers, carbon black, zinc oxide, titanium dioxide, solid microbeads, solid or hollow glass beads, silica, silicates, and chalk, with the addition of blocking-free isocyanates being a further possibility.

The acrylic PSAs blended in this way are preferably processed further from the melt (as hotmelts). For use as an adhesive for adhesive tapes, they are coated onto a backing and then crosslinked in order to increase the cohesion.

It is advantageous to carry out coating of the functionalized acrylic PSA from the melt in gel-free form. For this purpose it is preferred to use melt dies or extrusion dies having a slot width of from 100 to 500 µm, more preferably from 150 to 300 µm.

As backing materials in this context it is possible to use the materials which are customary and familiar to the skilled worker, such as films (polyesters, PET, PE, PP, BOPP, PVC), nonwovens, foams, wovens and woven films, and also, where appropriate, release paper (for example, glassine, HDPE, LDPE). This list is not intended to be exclusive.

The adhesives are crosslinked with UV light or with ionizing radiation. Remaining vinyl compounds which have not undergone reaction during the hotmelt process or reactive extrusion react with the radicals that are formed during crosslinking and at this point in time, at the latest, become attached to the polymer, so that they are no longer able to escape from the PSA tape at a later time. Crosslinking by UV rays or electron beams proceeds with great efficiency owing to the double bonds the side chains contain.

In comparison to non-functionalized polyacrylates, it is possible to lower the dose required for optimum crosslinking, thereby requiring less energy and, in the case of electron beam crosslinking, causing less damage to the backing material. Moreover, a cohesion-enhancing effect has been obtained.

In contrast to polyacrylates modified by allylic double bonds, there is no substantial reduction in thermal stability in the case of the polyacrylates produced by the inventive process. The thermal stability remains sufficiently high for processing by the hotmelt coating process. Accordingly, all-acrylate systems prepared in this way are gel-free for at least 48 hours at 140° C., resin-blended systems at 120° C.

The process of the invention opens up application of the process of reactive extrusion for the preparation of polyacrylate-based PSAs. This result is surprising and could not have been foreseen by the skilled worker: on the contrary, the skilled worker would have expected the very drastic operating conditions (high temperatures, long residence times) typical of reactive extrusion to lead to a high level of gelling in the extruder.

Accordingly, polyacrylates prepared in the process of the invention have incorporated into them carboxylic anhydride groups, carboxylic acid groups, and hydroxyl groups; furthermore, (meth)acrylate groups are present as side chains. Under the conditions of reactive extrusion secondary reactions would have been expected, in the form for example of transesterification reactions, particularly those of the polymer chains with one another. Secondary reactions of this kind would result in a high level of gelling of the polyacrylate composition. Unexpectedly, such reactions were to all intents and purposes not observed; instead, a reaction takes place preferentially, in accordance with the invention, between the carboxylic acid groups (preferably maleic anhydride groups) and the functional groups B of the added monomers (preferably hydroxyl groups). This, surprisingly, allows polymer-analogous reactions to be carried out in an extruder, leading to low extruder residence times owing to the high reaction rates.

In this system, gel-free polyacrylate compositions can be prepared which have a high stability in respect of a gelling process ("gel-free" indicates compliance with the requirements for coatability of the compositions using the standard coating apparatus). Owing to the freedom from gel, the polyacrylate compositions can be used for adhesives which can be coated from the melt, and can thus be used as PSAs for PSA tapes, for example. The coatability is distinguished by a uniform (homogeneous) coating pattern, with no inhomogeneities, if coating takes place through the standard coating dies (melt dies or extrusion dies having a slot width of from 100 to 500 µm, more preferably from 150 to 300 µm) onto, for example, polyester backings with a thickness of 50 µm. The polyacrylate compositions commonly prepared in reactive extrusion processes do not meet these requirements and cannot be used as PSAs. The coating of the PSA onto a backing takes place very preferably in an inline process, though as an alternative can also be operated offline. After coating onto the backing, the PSA can then be subjected to the desired crosslinking reaction.

The process of the invention provides for the first time the incorporation of (meth)acrylate groups into the side chains of polyacrylates in hotmelt systems. This presents the advantage of very gentle crosslinking methods, since crosslinking can be carried out directly by way of the incorporated acrylate groups. Where crosslinking is carried out using electron beams, the crosslinking reaction rate is very high and the conversion of the acrylate groups is high. Accordingly, polyacrylate PSAs prepared and crosslinked by the inventive process possess very little, if any, post-crosslinking potential. Crosslinker substances which are normally added in addition are generally not reacted fully during the crosslinking reaction, with the consequences that the PSAs age and the PSA products become unusable over the course of time.

EXAMPLES
Commercially Available Chemicals Used—Trade Names

| Product | Manufacturer | Chemical composition |
|---|---|---|
| Novares T K90 | Rüttgers | Aliphatic, modified hydrocarbon resin comprising a copolymer of unsaturated aromatic C9/C10 hydrocarbons and an aliphatically unsaturated component Softening range 85 to 95° C. |
| Vazo 67 | DuPont | 2,2'-Azobis(2-methylbutyronitrile) |
| Perkadox 16 | Akzo Nobel | Bis-(4-tert-butylcyclohexyl) peroxydicarbonate |
| Irgacure 819 | Ciba Geigy | Bis(2,4,6-trimethylbenzoyl)-phenylphosphine oxide |

Test Methods

The following test methods were used to evaluate the technical adhesive properties of the PSAs prepared.

Shear Strength (Test A)

A strip 13 mm wide of the adhesive tape was applied to a smooth steel surface which had been cleaned three times with acetone and once with isopropanol. The area of application measured 20 mm×13 mm (length×width). The adhesive tape was then pressed onto the steel backing four times using a 2 kg weight. At room temperature, a 1 kg weight was fastened to the adhesive tape and the time taken for the weight to fall off was measured.

The shear stability times measured are reported in minutes and correspond to the average of three measurements.

Determination of the Gel Fraction (Test B)

The carefully dried, solvent-free adhesive samples are welded into a pouch of polyethylene nonwoven (Tyvek web). From the difference in the sample weights before and after extraction with toluene the gel index is determined, i.e., the percentage weight fraction of the polymer that is not soluble in toluene.

IR Spectroscopy

The FT-IR IFS 45 spectrometer from Bruker was used for the measurement. A calibration plot was first compiled using different concentrations of the individual carboxylic anhydrides. The conversion of the corresponding fractions of carboxylic anhydride was determined by measuring the percentage fall in the CO band.

Samples Analyzed

The carboxylic anhydrides used are available commercially. 2-HEA (2-hydroxyethyl acrylate) and 2-HEMA (2-hydroxyethyl methacrylate) were purified by distillation beforehand and stored under a nitrogen atmosphere.

Example 1

A reactor conventional for free-radical polymerizations was charged with 500 g of 2-ethylhexyl acrylate, 350 g of methyl acrylate, 70 g of butyl acrylate, 80 g of 4-methacryloyloxyethyl trimellitate anhydride and 540 g of acetone/special-boiling-point spirit (1:1). Nitrogen gas was passed through the mixture for 45 minutes, followed by double degassing, after which the reactor was heated to 58° C. with stirring and 0.2 g of azoisobutyronitrile (AIBN) was added. The external heating bath was then heated to 70° C. and reaction was carried out constantly at this external temperature. After a reaction time of 1 hour a further 0.2 g of AIBN was added. After 3 hours and 6 hours, in each case 250 g of acetone/special-boiling-point spirit (1:1) were used for dilution. The reaction was terminated after a time of 24 hours and the mixture was cooled to room temperature.

For adhesive testing, 100 g of the adhesive (based on solids) were blended with 0.4 g of bis(2,4,6-trimethylbenzoyl)phenylphosphine oxide (Irgacure 819; Ciba Geigy) and the adhesive was applied at a coverage of 50 g/m$^2$ (based on solids) to a primed PET film (23 μm thick). The specimens were then irradiated at 20 m/min (4 passes under the lamp) using a UV irradiation unit from Eltosch (254 nm, 120 W/cm).

The resulting specimens were then subjected to adhesive testing in accordance with test methods A and B.

Example 2

A reactor conventional for free-radical polymerizations was charged with 10 g of acrylic acid, 375 g of 2-ethylhexyl acrylate, 200 g of methyl acrylate, 375 g of butyl acrylate, 40 g of itaconic anhydride and 290 g of acetone/special-boiling-point spirit (1:1). Nitrogen gas was passed through the mixture for 45 minutes, followed by double degassing, after which the reactor was heated to 58° C. with stirring and 0.2 g of azoisobutyronitrile (AIBN) was added. The external heating bath was then heated to 75° C. and reaction was carried out constantly at this external temperature. After a reaction time of 1 hour a further 0.2 g of AIBN was added. After 3 hours and 6 hours, in each case 250 g of acetone/special-boiling-point spirit (1:1) were used for dilution. The reaction was terminated after a time of 24 hours and the mixture was cooled to room temperature.

For adhesive testing, the adhesive was applied at a coverage of 50 g/m$^2$ (based on solids) to a primed PET film (23 μm thick). The specimens were then irradiated with an electron beam dose of 20 kGy at an acceleration voltage of 230 kV (EBC unit from Crosslinking). The resulting specimens were then subjected to adhesive testing in accordance with test methods A and B.

Example 3

A reactor conventional for free-radical polymerizations was charged with 20 g of acrylic acid, 810 g of 2-ethylhexyl acrylate, 50 g of methyl acrylate, 120 g of 4-methacryloyloxyethyl trimellitate anhydride and 540 g of acetone/special-boiling-point spirit (1:1). Nitrogen gas was passed through the mixture for 45 minutes, followed by double degassing, after which the reactor was heated to 58° C. with stirring and 0.2 g of azoisobutyronitrile (AIBN) was added. The external heating bath was then heated to 70° C. and reaction was carried out constantly at this external temperature. After a reaction time of 1 hour a further 0.2 g of AIBN was added. After 3 hours and 6 hours, in each case 250 g of acetone/special-boiling-point spirit (1:1) were used for dilution. The reaction was terminated after a time of 24 hours and the mixture was cooled to room temperature.

For adhesive testing, the adhesive was applied at a coverage of 50 g/m$^2$ (based on solids) to a primed PET film (23 μm thick). The specimens were then irradiated with an electron beam dose of 15 kGy at an acceleration voltage of 230 kV (EBC unit from Crosslinking). The resulting specimens were then subjected to adhesive testing in accordance with test methods A and B.

Example 4

A reactor conventional for free-radical polymerizations was charged with 20 g of acrylic acid, 430 g of 2-ethylhexyl acrylate, 100 g of methyl acrylate, 430 g of butyl acrylate, 20 g of maleic anhydride and 212 g of acetone/special-boiling-point spirit (1:1). Nitrogen gas was passed through the mixture for 45 minutes, followed by double degassing, after which the reactor was heated to 58° C. with stirring and 0.2 g of azoisobutyronitrile (AIBN) was added. The external heating bath was then heated to 75° C. and reaction was carried out constantly at this external temperature. After a reaction time of 1 hour a further 0.2 g of AIBN was added. After 3 hours and 6 hours, in each case 300 g of acetone/ special-boiling-point spirit (1:1) were used for dilution. The reaction was terminated after a time of 24 hours and the mixture was cooled to room temperature.

For adhesive testing, the adhesive was applied at a coverage of 50 g/m² (based on solids) to a primed PET film (23 μm thick). The specimens were then irradiated with an electron beam dose of 25 kGy at an acceleration voltage of 230 kV (EBC unit from Crosslinking).

The resulting specimens were then subjected to adhesive testing in accordance with test methods A and B.

Example 5

A reactor conventional for free-radical polymerizations was charged with 1500 g of 2-ethylhexyl acrylate, 200 g of methyl acrylate, 100 g of acrylic acid, 100 g of maleic anhydride, 100 g of N-tert-butylacrylamide and 330 g of acetone. Nitrogen gas was passed through the mixture for 45 minutes, followed by double degassing, after which the reactor was heated to 66° C. with stirring and 1 g of Vazo 67™ (DuPont) was added. After 8 hours there was again addition of 1 g of Vazo 67™ (DuPont) and 500 g of acetone. After 24 hours and 28 hours, in each case 2.5 g of Perkadox 16 (Akzo Nobel) were added. After 32 hours, dilution was carried out using 600 g of acetone. The reaction was terminated after 48 hours and the mixture was cooled to room temperature.

For adhesive testing, the adhesive was applied at a coverage of 50 g/m² (based on solids) to a primed PET film (23 μm thick). The specimens were then irradiated with an electron beam dose of 10 kGy at an acceleration voltage of 230 kV (EBC unit from Crosslinking).

The resulting specimens were then subjected to adhesive testing in accordance with test methods A and B.

Example 6

In comparison to Example 5, the acrylic PSA was blended with 30% by weight (based on the polymer) of hydrocarbon resin TK 90™ (Rüttgers) and used for coating. The procedure was as in Example 5. The composition was irradiated with an EB dose of 30 kGy with an acceleration voltage of 230 kV.

Implementation of the Hotmelt Operation in a Recording Extruder:

The shearing and thermal exposure of the acrylic hotmelts was carried out using the Rheomix 610p recording extruder from Haake. The drive unit used was the Rheocord RC 300p device. The instrument was controlled using the PolyLab System software. The extruder was charged in each case with 52 g of the acrylic PSA/monomer mixture (~80% fill level). The experiments were conducted at a kneading temperature of 110 or 130° C., a rotary speed of 30 rpm, and a kneading time of one hour. The specimens were subsequently coated as hotmelts through a slot die at about 130° C.

Example 1#

In analogy to Example 1, the acrylic PSA was freed from the solvent after cooling and 100 g of the acrylic hotmelt were mixed with 1.8 g of 2-HEA (2-hydroxyethyl acrylate) and about 0.1 g of 4-vinylaniline. 52 g of this mixture were processed at 110° C. in the recording extruder in accordance with the procedure set out above. After the end of the reaction and after coating, the procedure of Example 1 was followed.

The conversion in the reaction was measured by way of IR spectroscopy.

Example 2#

In analogy to Example 2, the acrylic PSA was freed from the solvent after cooling and 100 g of the acrylic hotmelt were mixed with 4.6 g of 2-HEMA (2-hydroxyethyl methacrylate) and about 0.1 g of 4-vinylaniline. 52 g of this mixture were processed at 130° C. in the recording extruder in accordance with the procedure set out above. After the end of the reaction and after coating, the procedure of Example 2 was followed. The conversion in the reaction was measured by way of IR spectroscopy.

Example 3#

In analogy to Example 3, the acrylic PSA was freed from the solvent after cooling and 100 g of the acrylic hotmelt were mixed with 6.1 g of 2-HEMA (2-hydroxyethyl methacrylate) and about 0.1 g of 4-vinylaniline. 52 g of this mixture were processed at 130° C. in the recording extruder in accordance with the procedure set out above. After the end of the reaction and after coating, the procedure of Example 3 was followed.

The conversion in the reaction was measured by way of IR spectroscopy.

Example 4#

In analogy to Example 4, the acrylic PSA was freed from the solvent after cooling and 100 g of the acrylic hotmelt were mixed with 2.6 g of 2-HEMA (2-hydroxyethyl methacrylate) and about 0.1 g of 4-vinylaniline. 52 g of this mixture were processed at 130° C. in the recording extruder in accordance with the procedure set out above. After the end of the reaction and after coating, the procedure of Example 4 was followed.

The conversion in the reaction was measured by way of IR spectroscopy.

Example 5#

In analogy to Example 5, the acrylic PSA was freed from the solvent after cooling and 100 g of the acrylic hotmelt were mixed with 5.8 g of 2-HEMA (2-hydroxyethyl methacrylate). 52 g of this mixture were processed at 150° C. for 1 minute at 70 rpm in the recording extruder in accordance with the procedure set out above. After the end of the reaction and after coating, the procedure of Example 5 was followed.

The conversion in the reaction was measured by way of IR spectroscopy.

Example 6#

In comparison to Example 5#, the functionalized acrylic hotmelt was blended with 30% by weight (based on the polymer) of hydrocarbon resin TK 90™ (Rüttgers) and coated as a hotmelt from the melt. The procedure was as in Example 5#. The composition was irradiated with an EB dose of 30 kGy with an acceleration voltage of 230 kV.

Results

To prepare the acrylic pressure sensitive adhesives, the following acrylates were first of all polymerized with the comonomer concentrations compiled in Table 1. Polymerization was carried out conventionally using AIBN in a mixture of acetone and special-boiling-point spirit. The individual reaction regimes have been described in the section above.

TABLE 1

| Example | AS [%] | 2-EHA [%] | MA [%] | n-BA [%] | anhydride |
|---------|--------|-----------|--------|----------|-----------|
| 1 | 0 | 50 | 35 | 7 | 8% BSI |
| 2 | 1 | 37.5 | 20 | 37.5 | 4% ISA |
| 3 | 2 | 81 | 5 | 0 | 12% BSI |
| 4 | 2 | 43 | 10 | 43 | 2% MSA |
| 5 | 5 | 75 | 10 | 0 | 15% MSA |

AS: acrylic acid;
2-EHA: 2-ethylhexyl acrylate;
MA: methyl acrylate;
n-BA: n-butyl acrylate;
MSA: maleic anhydride;
ISA: itaconic anhydride;
BSI: 4-methacryloyloxyethyl trimellitate anhydride.

In addition to their use for reactive extrusion, examples 1–5 were also subjected to adhesive testing and used as references. For this purpose the polymers were applied conventionally from solution onto a primed polyester film 23 μm thick. After drying at 120° C. for 10 minutes the applied mass of the pure adhesive was 50 g/m². After curing, the gel index of the specimens irradiated with electron beams or UV light was measured, after which the cohesion was determined by way of the shear test at room temperature. Table 2 shows the results.

TABLE 2

| Example | Electron beam dose [kGy] | UV[a] lamp passage | Gel index [%] | Shear stability times RT, 10 N [min] |
|---------|--------------------------|---------------------|---------------|--------------------------------------|
| 1 | 0 | 4x[b] | 58 | 580 |
| 2 | 20 | 0 | 39 | 1490 |
| 3 | 15 | 0 | 30 | 7785 |
| 4 | 25 | 0 | 42 | 6840 |
| 5 | 10 | 0 | 5 | 5810 |
| 6 | 30 | 0 | 2 | 165 |

[a]120 W/cm, 254 nm wavelength (medium pressure rotary lamp from Eltosch), 20 m/min web speed;
[b]with 0.4% by weight of bis(2,4,6-trimethylbenzoyl)-phenylphosphine oxide.
Application coverage: 50 g/m²

Example 1 was cured with UV light (254 nm). At a web speed of 20 m/min a gel index of 58% was obtained. As a result of the relatively high a polar fraction, the cohesion of this adhesive is low. In contrast, examples 2–6 were cured with electron beams. The gel indices measured lay between 2 and 42%. The shear strength as well, with a shearing weight of 10 N, was in all cases clearly below the required mark of 10000 minutes for an acrylic PSA of high shear strength. Example 6 lent itself particularly poorly to crosslinking by means of electron beams, since electron beam crosslinking in the presence of resins is generally less efficient.

With these results as reference, Examples 1–5 were concentrated, i.e., freed from solvent, and so prepared for the hotmelt operation. The acrylic hotmelts were then reacted optionally with 0.1% by weight of 4-vinylaniline and with different amounts of hydroxylated acrylates. The reaction was conducted in a recording extruder, which is able to vary the degree of shear and the reaction temperature. It is also possible to record the variation in torque. For clarity, the process parameters and the amounts of vinyl compounds used are listed in Table 3.

TABLE 3

| Example | % by wt. of 4-vinyl-aniline | % by wt. of 2-HEA | % by wt. of 2-HEMA | Rotary speed [rpm] | Reaction temperature [° C.] |
|---------|------------------------------|--------------------|--------------------|---------------------|-----------------------------|
| 1# | 0.1 | 1.8 | 0 | 30 | 110 |
| 2# | 0.1 | 0 | 4.6 | 30 | 130 |
| 3# | 0.1 | 0 | 6.1 | 30 | 130 |
| 4# | 0.1 | 0 | 2.7 | 30 | 130 |
| 5# | 0 | 0 | 5.8 | 70 | 150 |

2-HEA = 2-hydroxyethyl acrylate;
2-HEMA = 2-hydroxy-ethyl methacrylate

Example 1# was reacted with only 0.5 mole equivalent of 2-HEA. In contrast, examples 2#–4# were admixed in each case with equimolar amounts of 2-HEMA. The catalyst selected was 4-vinylaniline, since the double bond is incorporated into the polyacrylate during crosslinking and so no residual fractions of base remain as volatile fractions in the PSA. The rotary speed for mixing was 30 rpm and so was relatively low, in order to simulate low shear of the PSA. In the case of Example 5#, a higher shear was introduced. The reaction temperature was set at 110° C. for Example 1#, since this polymer was the lowest in viscosity. For examples 2#–4# the reaction and extrusion temperature was 130° C., in the case of Example 5# it was 150° C. The reaction time for all specimens lay at 1 hour, in the case of Example 5# at 1 minute. Thereafter, the examples were firstly coated as hotmelts through a die onto a primed polyester backing (23 μm thick) and then, depending on example, cured in an analogy to Table 2 using UV or electron beams and subjected to adhesive testing. The application coverage of the pure acrylic PSA was again 50 g/m². In addition, the conversion in the reaction was determined by FT-IR. The results of these tests are summarized in Table 4.

TABLE 4

| Example | Electron beam dose [kGy] | UV[a] lamp passage | Gel index [%] | Shear stability times RT, 10 N [min] | Conversion of anhydride [%] |
|---------|--------------------------|---------------------|---------------|---------------------------------------|------------------------------|
| 1# | 0 | 4 x[b] | 70 | 4 675 | 38 |
| 2# | 20 | 0 | 64 | +10 000 | 80 |
| 3# | 15 | 0 | 68 | +10 000 | 76 |
| 4# | 25 | 0 | 52 | +10 000 | 82 |
| 5# | 10 | 0 | 65 | +10 000 | 84 |
| 6# | 30 | 0 | 41 | 3 415 | 84 |

[a]120 W/cm, 254 nm wavelength (medium pressure rotary lamp from Eltosch), 20 m/min web speed;
[b]with 0.4% by weight of bis(2,4,6-trimethylbenzoyl)-phenylphosphine oxide.
Application coverage: 50 g/m²

The conversion of anhydride, expressed by the percentage decrease in the CO IR band, is relatively low in the case of Example 1#, since only 0.5 mole equivalent of 2-HEA was used. Nevertheless, the effect was considerable for UV crosslinking. Under the same crosslinking conditions, the gel index rose from 58 to 70%. In addition, the composition became significantly more cohesive after crosslinking, owing to the reactive extrusion with 2-HEA. The same trend was recorded for examples 2#–5#. The gel indices rose, in some cases considerably, and the shear strength of these examples was generally more than 10000 minutes. Here, a conversion of about 80% was detected by IR spectroscopy.

Even the sample blended with resin shows that by reactive extrusion it is possible to achieve a significant reduction in the electron beam dose required.

With these examples it can be demonstrated that the principle of reactive extrusion can be utilized for the preparation of readily crosslinkable acrylic hotmelts. Furthermore, a cohesion-enhancing effect was found.

As a result of the marked increased crosslinking rate it is possible to achieve much better and more effective crosslinking, especially if acrylic and methacrylic double bonds have been introduced as crosslinking-functional groups. Even acrylic PSAs prepared by this process which have a molecular weight reduced by 20–40% as compared with conventionally prepared (not functionalized) acrylic PSAs achieve adhesive properties which are just as good as those of the conventionally prepared PSAs of higher molecular weight, while owing to the low molecular weight they have a greatly reduced viscosity and therefore a considerably improved processing quality in the hotmelt operation.

What is claimed is:

1. A process for preparing crosslinked acrylic pressure sensitive adhesives which comprises
    first preparing polyacrylates by free-radical (co) polymerization in water, organic solvent or solvents or a mixture thereof from a monomer mixture comprising:
    (a) 45–95% by weight of acrylic acid monomers, methacrylic acid monomers, or both, of the following structure:

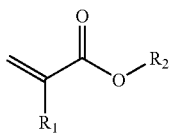

where $R_1$=H or $CH_3$
    and $R_2$=an alkyl chain with 2–20 carbon atoms,
    (b) 0.5 to 25% by weight of one or more carboxylic anhydrides containing olefinic double bonds,
    (c) 0–30% by weight of further olefinically unsaturated monomers possessing functional groups A,
    concentrating the polymers thus prepared to form a concentrated polyacrylate composition having a water, solvent or water and solvent concentration of $\leq 2\%$ by weight,
    adding to the concentrated polyacrylate composition further monomers which have at least two functional groups B and C, the groups B being groups which are capable of entering into polymer-analogous reactions with the carboxylic anhydrides, and the groups C being crosslinkable groups,
    reacting the functional groups B with the carboxylic anhydride, to attach the monomers containing functional groups B as side chains to the polymers,
    after the reaction between the functional groups B and the carboxylic anhydride, crosslinking the polymers with high-energy radiation to form a cross-linked acrylic pressure sensitive adhesive.

2. The process of claim 1, wherein after reaction of the functional groups B with the carboxylic anhydride and before the crosslinking step, the composition is applied from the melt to a backing.

3. The process of claim 1, wherein the addition of the monomers possessing the functional groups B and C and the reaction of the functional groups B with the carboxylic anhydride take place directly after the concentration step.

4. The process of claim 1, wherein the solvent, water or solvent and water content after the concentration step is $\leq 0.5\%$ by weight.

5. The process of claim 1, wherein the functional groups B of the monomers are selected from the group consisting of hydroxyl groups, alkoxy groups, mercapto groups, thioether groups, unsubstituted and substituted amino groups, oxalines, unsubstituted or substituted amido groups and combinations thereof.

6. The process of claim 1, wherein the functional groups C of the monomers are selected from the group consisting of vinyl groups, acrylate groups, methacrylate groups and combinations thereof.

7. The process of claim 1, wherein the monomers containing functional groups B and C are selected from the group consisting of 2-hydroxyethyl acrylate (2-HEA, acrylic acid 2-hydroxyethyl ester), hydroxypropyl acrylate (acrylic acid 3-hydroxypropyl ester), 2-hydroxyethyl methacrylate (2-HEMA, methacrylic acid 2-hydroxyethyl ester), hydroxypropyl methacrylate (methacrylic acid 3-hydroxypropyl ester) and combinations thereof.

8. The process of claim 1, wherein the molar ratio of the number $n_s$ of the functional groups B of the added monomers to the number $n_{CSA}$ of the copolymerized carboxylic anhydride units, $n_B/n_{CSA}$, is between 0.8 and 1.2.

9. The process of claim 1, wherein a catalyst is added to the polyacrylate composition.

10. The process of claim 1, wherein the polymer-analogous reaction is conducted at a temperature of between 60° C. and 180° C.

11. The process of claim 1, wherein resins or additives selected from the group consisting of aging inhibitors, light stabilizers, ozone protectants, fatty acids, plasticizers, nucleators, blowing agents, accelerators, fillers and combinations thereof are added to the monomer mixture or to the acrylic pressure sensitive adhesive.

12. The process of claim 1, wherein crosslinkers, photoinitiators or both are added to the polymeric composition to be crosslinked.

13. The process of claim 1, wherein electron beams or UV radiation are used as high-energy radiation for the crosslinking.

14. An adhesive tape comprising the acrylic pressure sensitive adhesive prepared by the process of claim 1 on one or both sides of a backing.

15. The process of claim 3, wherein said reaction is conducted in an extruder.

16. The process of claim 8, wherein said ratio is between 0.8 and 1.

17. The process of claim 9, wherein said catalyst is a Lewis acid or a Lewis base.

18. The process of claim 17, wherein said Lewis acid is p-toluenesulfonic acid and said Lewis base is 4-vinylaniline.

19. The process of claim 10 wherein said temperature is between 110° and 160° C.

20. The process of claim 12, wherein said crosslinkers are selected from the group consisting of difunctional acrylates, difunctional methacrylates, polyfunctional acrylates, polyfunctional methacrylates and combinations thereof.

* * * * *

UNITED STATES PATENT AND TRADEMARK OFFICE
CERTIFICATE OF CORRECTION

PATENT NO. : 7,084,185 B2  
APPLICATION NO. : 10/297149  
DATED : August 1, 2006  
INVENTOR(S) : Marc Husemann et al.

Page 1 of 1

It is certified that error appears in the above-identified patent and that said Letters Patent is hereby corrected as shown below:

Title Page Abstract (57), line 1, "ensitive" should read -- sensitive --.

Title Page Abstract (57), line 3, "copolymericzation" should read -- copolymerization --.

Column 4, line 21, "$\leqq$" should read -- $\leq$ --.

Column 6, line 10, "$\leqq$" should read -- $\leq$ --.

Column 15, line 44, "$\leqq$" should read -- $\leq$ --.

Column 16, line 5, "$\leqq$" should read -- $\leq$ --.

Signed and Sealed this

Seventeenth Day of November, 2009

David J. Kappos  
*Director of the United States Patent and Trademark Office*